United States Patent
Sumizawa

(10) Patent No.: US 8,825,349 B2
(45) Date of Patent: Sep. 2, 2014

(54) ON-VEHICLE INFORMATION TERMINAL AND INFORMATION DISTRIBUTION SYSTEM

(75) Inventor: Akio Sumizawa, Sagamihara (JP)

(73) Assignee: Clarion Co., Ltd., Tokyo (JP)

( * ) Notice: Subject to any disclaimer, the term of this patent is extended or adjusted under 35 U.S.C. 154(b) by 332 days.

(21) Appl. No.: 12/881,569

(22) Filed: Sep. 14, 2010

(65) Prior Publication Data

US 2011/0066361 A1 Mar. 17, 2011

(30) Foreign Application Priority Data

Sep. 15, 2009 (JP) .................................. 2009-213052

(51) Int. Cl.
*G01C 21/26* (2006.01)
*G08G 1/0967* (2006.01)
*G08G 1/09* (2006.01)
*G01C 21/36* (2006.01)

(52) U.S. Cl.
CPC .......... *G08G 1/093* (2013.01); *G08G 1/096733* (2013.01); *G01C 21/3691* (2013.01)
USPC ........... 701/117; 701/414; 701/415; 701/423; 701/516; 340/995.13

(58) Field of Classification Search
USPC ....................................................... 701/117
See application file for complete search history.

(56) References Cited

U.S. PATENT DOCUMENTS

| | | | |
|---|---|---|---|
| 6,973,318 B2 * | 12/2005 | Jambhekar et al. ........ | 455/456.1 |
| 7,693,657 B2 | 4/2010 | Endo et al. | |
| 8,315,784 B2 | 11/2012 | Endo et al. | |
| 2004/0203840 A1 * | 10/2004 | Jambhekar et al. ........ | 455/456.1 |
| 2006/0167616 A1 | 7/2006 | Yamane et al. | |
| 2008/0208469 A1 * | 8/2008 | Obradovich et al. ......... | 701/213 |
| 2010/0145987 A1 * | 6/2010 | Harper et al. ................ | 707/770 |

FOREIGN PATENT DOCUMENTS

| | | |
|---|---|---|
| CN | 101111741 A | 1/2008 |
| CN | 101115972 A | 1/2008 |
| CN | 101409018 A | 4/2009 |
| JP | 2001-91269 A | 4/2001 |
| JP | 2003-148986 A | 5/2003 |
| JP | 2003-194554 A | 7/2003 |
| JP | 2004-109061 A | 4/2004 |
| JP | 2006-226977 A | 8/2006 |
| JP | 2007-80030 A | 3/2007 |
| WO | WO 03/047284 A1 | 6/2003 |

OTHER PUBLICATIONS

The Extended European Search Report dated Feb. 3, 2011 (Seven (7) pages).
Chinese Office Action dated Nov. 26, 2012 w/English translation (nineteen (19) pages).
Japanese-language Office Action with English translation dated Jan. 28, 2014 (7 pages).

\* cited by examiner

*Primary Examiner* — Shelley Chen
(74) *Attorney, Agent, or Firm* — Crowell & Moring LLP

(57) ABSTRACT

An on-vehicle information terminal includes a traffic information obtaining unit that obtains traffic information including at least either weather information or event information through wireless communication, a decision-making unit that makes a decision, based upon at least either the weather information or the event information, as to whether or not telematics information provided by a distribution server via a mobile communication network is to be downloaded, and a download unit that downloads the telematics information via the mobile communication network if the decision-making unit has determined that the telematics information is to be downloaded.

6 Claims, 3 Drawing Sheets

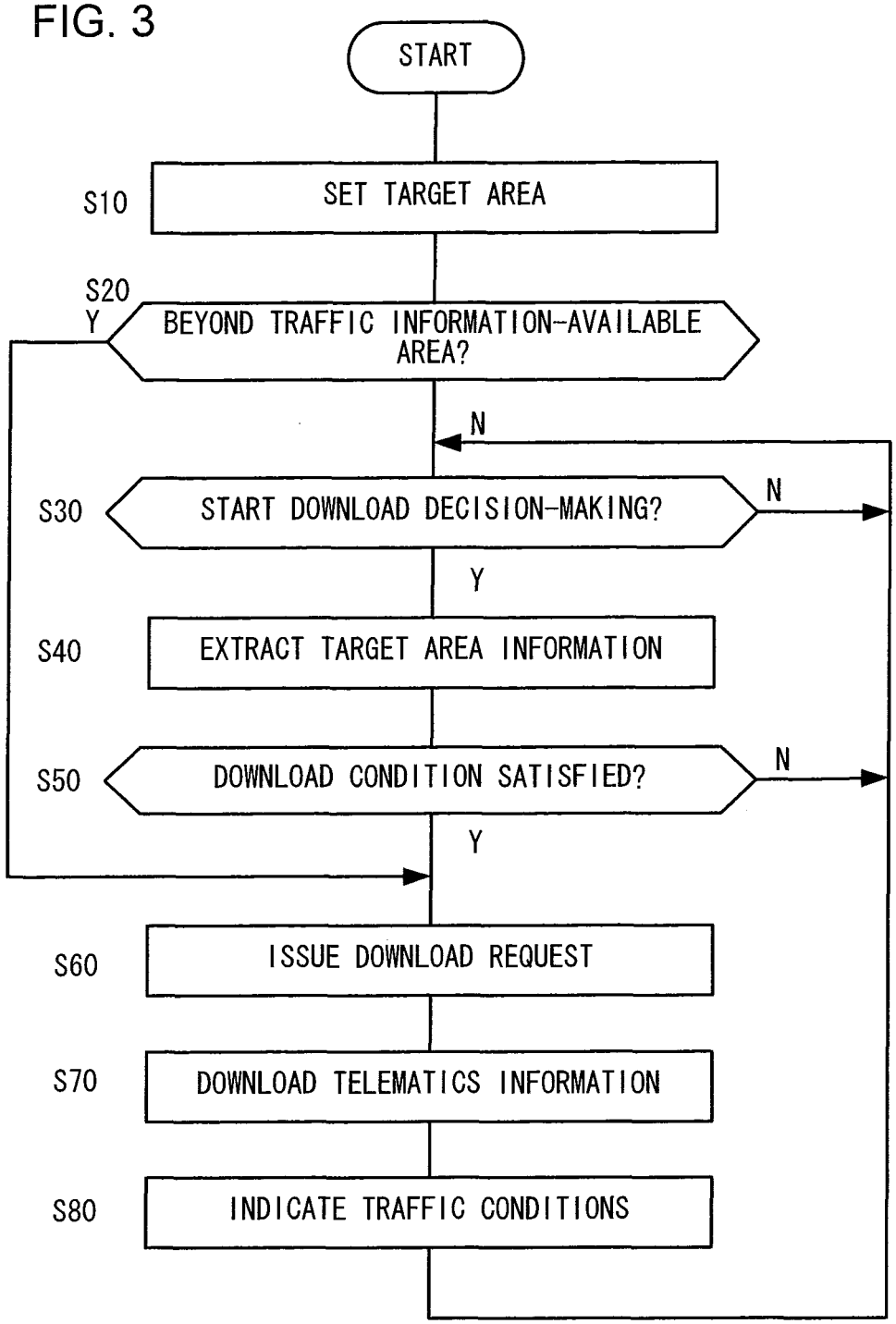

ON-VEHICLE INFORMATION TERMINAL AND INFORMATION DISTRIBUTION SYSTEM

INCORPORATION BY REFERENCE

The disclosure of the following priority application is herein incorporated by reference: Japanese Patent Application No. 2009-213052 filed Sep. 15, 2009.

BACKGROUND OF THE INVENTION

1. Field of the Invention

The present invention relates to an on-vehicle information terminal and an information distribution system for vehicles.

2. Description of Related Art

The applicant of the present invention previously submitted a patent application for a road traffic information distribution system through which road traffic information distributed through FM multiplex broadcasting or the like is received by an on-vehicle unit and also road traffic information for a specified target area to which a specific road traffic condition applies, is distributed to the on-vehicle unit from a distribution server via a mobile communication network such as a portable telephone network (see Japanese Laid Open Patent Publication No. 2007-80030).

An area where the traffic tends to congest readily, an area where the traffic congestion condition tends to vary greatly, an area where a traffic accident has occurred, an area where the traffic is congested more than usual, an area for which it is more difficult to provide accurate congestion projection or the like may be designated as the target area to which a specific road traffic condition applies in the road traffic information distribution system. An object of the present invention is to distribute information for various areas that may be related to the traffic congestion in addition to the types of areas listed above.

SUMMARY OF THE INVENTION

An on-vehicle information terminal according to a 1st aspect of the present invention comprises: a traffic information obtaining unit that obtains traffic information including at least either weather information or event information through wireless communication; a decision-making unit that makes a decision, based upon at least either the weather information or the event information, as to whether or not telematics information provided by a distribution server via a mobile communication network is to be downloaded; and a download unit that downloads the telematics information via the mobile communication network if the decision-making unit has determined that the telematics information is to be downloaded.

According to a 2nd aspect of the present invention, the on-vehicle information terminal of the 1st aspect may further comprise a target area setting unit that sets a target area for which the decision is made. In this on-vehicle information terminal, it is preferred that the decision-making unit decides that the telematics information is to be downloaded if the weather information indicates rain or snow as current weather in the target area or rain or snow is forecast for the target area a predetermined number of hours ahead from the current time, or if the event information indicates a specific event currently being held in the target area or a specific event to be held in the target area a predetermined number of hours ahead from the current time.

According to a 3rd aspect of the present invention, in the on-vehicle information terminal of the 1st or 2nd aspect, it is desirable that the traffic information further includes congestion information, and that the decision-making unit makes the decision also based upon the congestion information.

According to a 4th aspect of the present invention, in the on-vehicle information terminal of any one of the 1st through 3rd aspects, the decision-making unit can make the decision over predetermined time intervals or each time the traffic information is obtained by the traffic information obtaining unit.

According to a 5th aspect of the present invention, the on-vehicle information terminal of any one of the 1st through 4th aspects may further comprise a target area setting unit that sets a target area for which the decision is made. In this on-vehicle information terminal, it is preferred that the decision-making unit decides that the telematics information is to be downloaded if the traffic information for the target area is not available.

An information distribution system according to a 6th aspect of the present invention comprises: an on-vehicle information terminal of any one of the 1st through 5th aspects; and a distribution server that provides the telematics information to the on-vehicle information terminal via the mobile communication network.

According to the present invention, information can be distributed for areas that may be related to the traffic congestion.

BRIEF DESCRIPTION OF THE DRAWINGS

FIG. 3 presents a flowchart of the processing executed in the navigation apparatus.

DESCRIPTION OF PREFERRED EMBODIMENT

Figure 1:
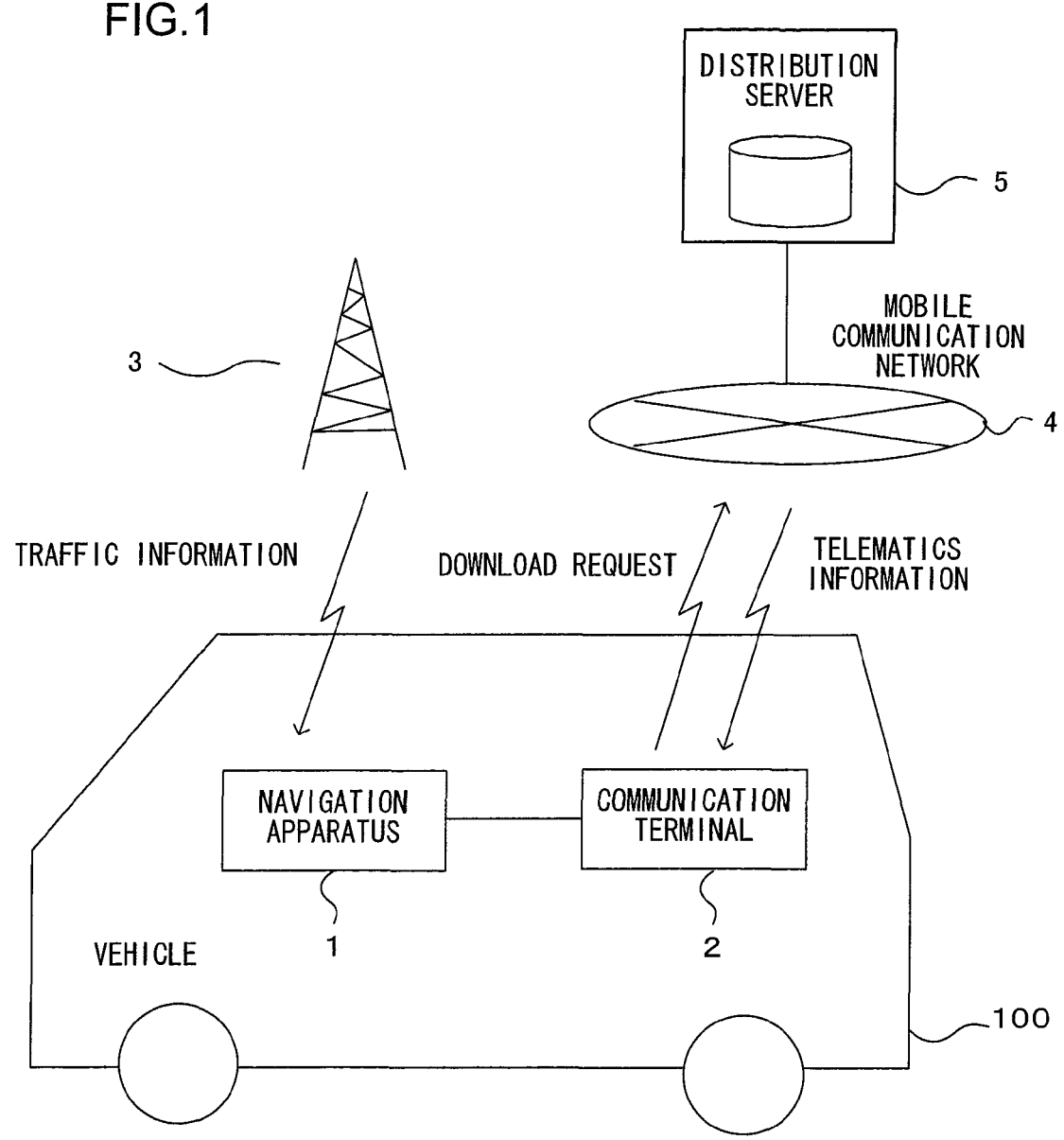
FIG. 1 shows the configuration of the information distribution system achieved in an embodiment of the present invention.

FIG. 1 shows the configuration of the information distribution system achieved in an embodiment of the present invention. The system comprises a navigation apparatus 1 and a communication terminal 2 both installed in a vehicle 100, a broadcasting facility 3 from which FM multiplex broadcast is provided, a mobile communication network 4 and a distribution server 5.

The navigation apparatus 1 guides the vehicle 100 to a destination having been set by bringing up a map on display based upon map data and searching for a recommended route to the destination. In addition, the navigation apparatus 1 receives traffic information transmitted through FM multiplex broadcasting from a traffic information distribution center (not shown) via the broadcasting facility 3. The types of information distributed as traffic information include weather information indicating the current weather or providing a weather forecast and event information on various types of events (e.g., festivals, street markets and sports events) that may affect road traffic conditions, in addition to congestion information reporting road congestion conditions or traffic control conditions.

The systems through which traffic information such as that described above is distributed in the known art include the VICS (Vehicle Information and Communication System) operating in Japan and the RDS-TMC (Radio Data System-Traffic Message Channel) operating in Europe. It is to be noted that while the traffic information is transmitted to the navigation apparatus 1 through FM multiplex broadcasting in the embodiment, the traffic information may be transmitted through an alternative method. For instance, the traffic information may be transmitted from roadside beacons or it may be transmitted through satellite broadcasting.

The navigation apparatus 1 issues a download request to the distribution server 5 so as to download telematics information corresponding to the current position of the vehicle 100 and the route along which it is traveling. In response to the download request, the distribution server 5 distributes telematics information to the navigation apparatus 1. The telematics information distributed from the distribution server 5 includes congestion information covering more roads than those covered in the congestion information included in the traffic information described earlier. Namely, as the distribution server 5 distributes the telematics information, the navigation apparatus 1 is able to obtain additional congestion information that is not provided in the traffic information. The telematics information provided by the distribution server 5 is received at the navigation apparatus 1 via the mobile communication network 4 and the communication terminal 2. The navigation apparatus 1 is thus able to download the telematics information originating from the distribution server 5.

The communication terminal 2 is connected to the navigation apparatus 1. Under control executed by the navigation apparatus 1, the communication terminal 2 is wirelessly connected with the mobile communication network 4. The distribution server 5 is connected to the mobile communication network 4. In other words, the navigation apparatus 1 is connected to the distribution server 5 via the communication terminal 2 and the mobile communication network 4.

It is to be noted that the wireless connection between the communication terminal 2 and the mobile communication network 4 is achieved via a wireless base station (not shown). Such wireless base stations, each capable of wirelessly communicating with communication terminals 2 currently located within a specific communication area surrounding the particular wireless base station, are in place at numerous points throughout the country. In addition, the navigation apparatus 1 and the communication terminal 2 may be connected through wireless communication such as infrared communication or Bluetooth instead of through a wired connection via a cable or the like. The communication terminal 2 may be, for instance, a portable telephone.

At the distribution server 5, congestion information related to roads in various regions is collected and stored and the contents of the stored congestion information are updated over predetermined time intervals. Based upon the congestion information, the distribution server 5 distributes the telematics information to the navigation apparatus 1. It is to be noted that as explained earlier, the congestion information provided as telematics information covers more roads than the congestion information included in the traffic information. This means that the distribution server 5 must collect congestion information for more roads than does the traffic information distribution center. For instance, congestion information originating from another information provider may be provided to the distribution server 5 in addition to the congestion information from the traffic information distribution center. As an alternative, the distribution server 5 may collect congestion information provided as probe data from vehicles traveling at various locations.

Figure 2:
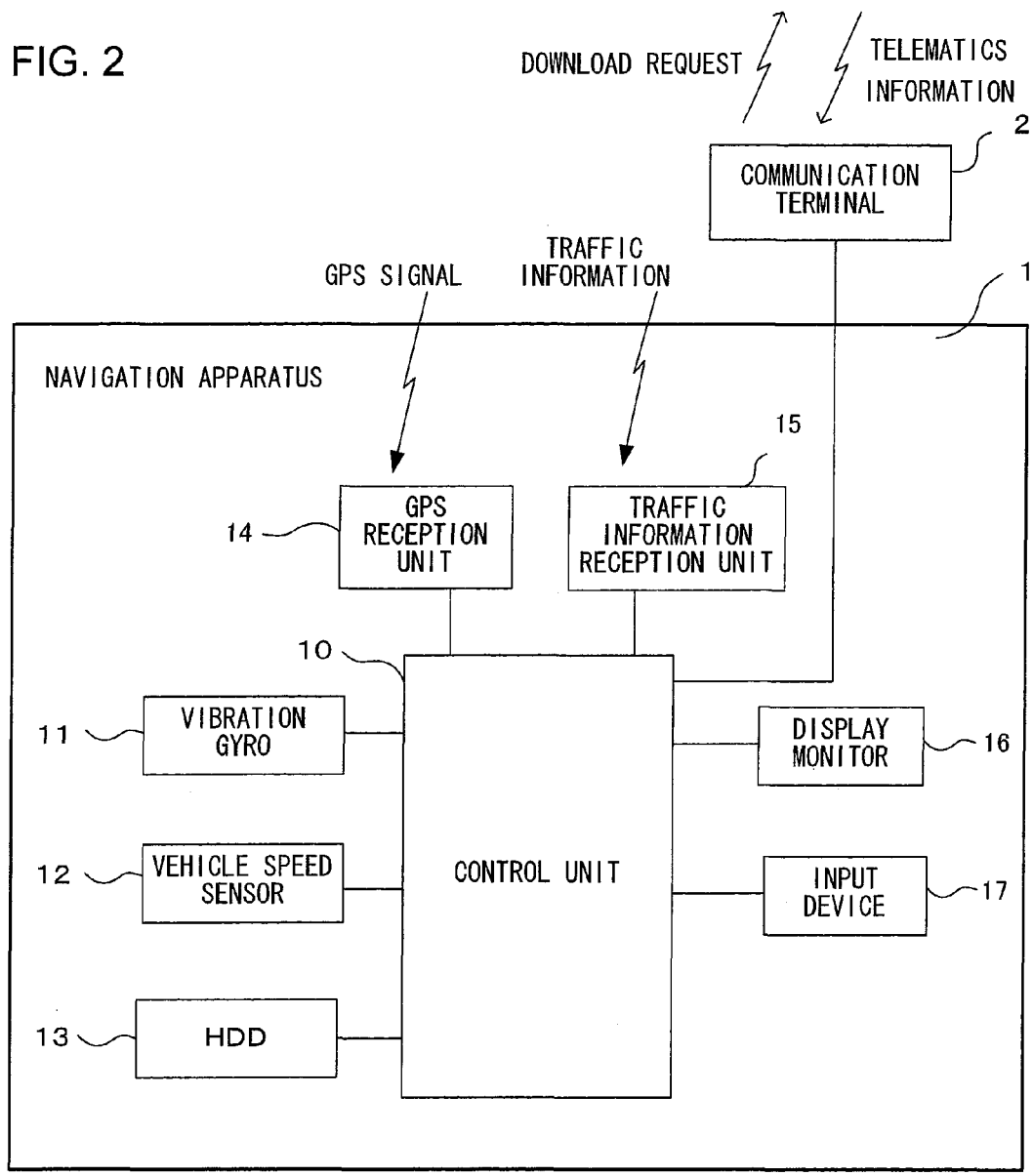
FIG. 2 is a block diagram showing the structure of the navigation apparatus.

The structure of the navigation apparatus 1 is illustrated in the block diagram in FIG. 2. The navigation apparatus 1 comprises a control unit 10, a vibration gyro 11, a vehicle speed sensor 12, a hard disk (HDD) 13, a GPS (global positioning system) reception unit 14, a traffic information reception unit 15, a display monitor 16 and an input device 17.

The control unit 10, constituted with a microprocessor, various peripheral circuits, a RAM, a ROM and the like, executes various types of processing to be described later based upon a control program and map data recorded in the HDD 13. The communication terminal 2 is connected to the control unit 10, and as the control unit 10 controls the communication terminal 2, the navigation apparatus 1 is able to send a download request to the distribution server 5 in FIG. 1. The telematics information distributed from the distribution server 5 in response to this download request is received at the communication terminal 2, which then outputs the received information to the control unit 10.

The vibration gyro 11 is a sensor that detects the angular speed of the subject vehicle. The vehicle speed sensor 12 detects the speed of the subject vehicle. As the subject vehicle motion is detected over predetermined time intervals via the sensors, the control unit 10 is able to determine the extent of subject vehicle positional displacement and based upon the extent of the subject vehicle positional displacement thus determined, the current position of the subject vehicle, i.e., the current location, is detected.

In the HDD 13, which is a non-volatile recording medium, various types of data including map data are recorded. The data recorded in the HDD 13 are read out as necessary under control executed by the control unit 10 and the data having been read out are utilized in various types of processing or control executed by the control unit 10.

It is to be noted that the map data recorded in the HDD 13 include route calculation data, route guidance data, road data and background data. The route calculation data are used when searching for the optimal route to a destination. The route guidance data, which are used to guide the subject vehicle to the destination through the route having been determined, indicate intersection names, road names and the like. The road data indicate road shapes and road categories. The background data indicate the shapes of geographical entities other than roads, such as rivers and railways, the positions of various facilities and the like. It is to be noted that the term "link" is used to refer to the minimum unit representing a road in the map data. In other words, each road in the map data is constituted with a plurality of links.

The GPS reception unit 14 receives a GPS signal transmitted from a GPS satellite and outputs the received GPS signal to the control unit 10. The GPS signal contains information indicating the location of the transmitting GPS satellite and the transmission time of the GPS signal, which can be used to determine the subject vehicle position and the current time. In other words, based upon such information contained in GPS signals received from at least a predetermined minimum number of GPS satellites, the current position of the subject vehicle and the current time can be calculated.

The traffic information reception unit 15 receives the traffic information transmitted through FM multiplex broadcasting from the traffic information distribution center via the broadcasting facility 3. The traffic information having been received at the traffic information reception unit 15 is then output to the control unit 10. The control unit 10 makes a decision as to whether or not to download telematics information by executing processing based upon the traffic information as detailed later and issues a download request to the distribution server 5 upon deciding that the telematics information is to be downloaded.

The display monitor 16, at which various images or video images are displayed, may be a liquid crystal display unit. A map of the area around the current subject vehicle position and the like are brought up on display at the display monitor 16. It is to be noted that the display monitor 16 should be installed at a position at which it can be viewed with ease by the driver, e.g., on the dashboard or in the instrument panel of the subject vehicle.

The input device 17 is a user interface via which the user performs various input operations to engage the navigation apparatus 1 in operation and includes various types of input switches. The user operates the input device 17 to enter the name of the facility or geographical point he wishes to set as the destination, to select a destination among preregistered locations or scroll the map along a desired direction. The input device 17 may be an operation panel or a remote control unit. As an alternative, the input device 17 and the display monitor 16 may be integrated into a single touch panel unit.

Once the user has set a specific destination by operating the input device 17, the navigation apparatus 1 searches for a route from the current position to the destination by designating the current position having been detected, as described above, as a route search start point and executing an arithmetic operation with a specific algorithm based upon the route calculation data included in the map data. The recommended route resulting from the route search is indicated on the map in a format distinguishable from other roads by, for instance, using a different display color. The navigation apparatus 1 guides the subject vehicle to the destination along the recommended route.

Next, the processing executed by the navigation apparatus 1 when downloading telematics information from the distribution server 5 is described in reference to the flowchart presented in FIG. 3. The processing in the flowchart is executed by the control unit 10 in the navigation apparatus 1.

In step S10, the control unit 10 sets a target area for which a decision as to whether or not to download telematics information is to be made. In this example, an area ranging over a predetermined distance from the current position of the vehicle 100 is designated as a target area. In addition, if a recommended route to a destination has already been set in the navigation apparatus 1, it is desirable that the target area include areas ranging over predetermined distances from the destination and the recommended route.

In step S20, the control unit 10 makes a decision as to whether or not the target area having been set in step S10 is beyond a traffic information-available area. If the target area is determined to be outside the traffic information-available area, i.e., if traffic information for the target area is not available, the operation proceeds to step S60. If, on the other hand, the target area is within the traffic information-available area, i.e., if traffic information for the target area is available, the operation proceeds to step S30. It is to be noted that the decision-making in step S20 may be executed based upon, for instance, the traffic information reception condition at the traffic information reception unit 15. As an alternative, the decision-making may be executed by referencing information indicating traffic information-available areas, which may be recorded in advance into the HDD 13 together with the map data.

In step S30, the control unit 10 makes a decision as to whether or not to start executing download decision-making. Upon deciding to start executing the download decision-making, the operation proceeds to the following step S40. The decision in step S30 is made based upon a decision-making start condition set in advance. Such a decision-making start condition may be set so as to start the download decision-making when, for instance, the user performs a specific operation via the input device 17. As an alternative, the decision-making start condition may be set so as to start the download decision-making over specific time intervals. In the latter case, an affirmative decision will be made in step S30 and the operation will proceed to step S40 when a predetermined length of time has elapsed since the preceding telematics information download. As a further alternative, the decision-making start condition may be set so as to start executing the download decision-making each time traffic information is obtained. In such a case, as traffic information received at the traffic information reception unit 15 is output to the control unit 10, an affirmative decision will be made in step S30 and the operation will proceed to step S40. However the present invention is not limited to these examples and a condition selected from various other decision-making start conditions may be designated as the decision-making start condition.

In step S40, the control unit 10 extracts information (target area information) related to the target area set in step S10 from the traffic information received at the traffic information reception unit 15. As a result, the congestion information, the weather information, the event information and the like for the target area, included in the traffic information having been obtained, are extracted as the target area information. It is to be noted that if traffic information has been received a plurality of times, it is desirable to extract the target area information from the most recently received traffic information.

In step S50, the control unit 10 makes a decision based upon the target area information extracted in step S40 as to whether or not a specific download condition is satisfied. In this example, a decision as to whether or not to download telematics information is made based upon at least either the weather information or the event information in the target area information having been extracted. For instance, if the weather information indicates rain or snow as the current weather in the target area or as the forecast weather a predetermined number of hours ahead of the current time for the target area, it may be decided that the download condition is satisfied. Or it may be decided that the download condition is satisfied if the event information indicates an event such as a festival, a street market or a sports event held currently in the target area or to be held a predetermined number of hours ahead from the current time in the target area. Upon deciding in step S50 that the download condition is satisfied, the operation proceeds to step S60. However, if it is decided that the download condition is not satisfied, the operation returns to step S30.

It is to be noted that the decision-making in step S50 may be executed based upon the congestion information in addition to the weather information or the event information as described above. For instance, it may be decided that the download condition is satisfied if the congestion information having been extracted as the target area information indicates a change in the congestion condition within the target area or traffic control such as a roadblock enforced in the target area.

In step S60, the control unit 10 controls the communication terminal 2 so as to transmit via the communication terminal 2 a telematics information download request to the distribution server 5. In this example, the target area for which the telematics information is to be downloaded is indicated to the distribution server 5 by transmitting information indicating the target area set in step S10, together with the download request. In response to the download request, the telematics information for the target area is transmitted from the distribution server 5 to the communication terminal 2 via the mobile communication network 4. The telematics information received at the communication terminal 2 is then output to the control unit 10.

In step S70, the control unit 10 downloads the telematics information transmitted from the distribution server 5, as described above, in response to the download request issued in step S60. It is to be noted that the control unit 10 may record the downloaded telematics information into the HDD 13 by outputting the telematics information to the HDD 13.

In step S80, the control unit 10 indicates the traffic conditions on the map based upon the telematics information downloaded in step S70. Upon executing the processing in step S80, the operation returns to step S30 to repeatedly execute the processing described above.

The following advantages are achieved through the embodiment described above.

(1) The navigation apparatus 1 obtains through wireless communication traffic information that includes at least either weather information or event information via the traffic information reception unit 15. In addition, through processing executed by the control unit 10, a decision is made (step S50) based upon at least either the weather information or the event information included in the traffic information having been obtained as to whether or not to download telematics information provided from the distribution server 5 via the mobile communication network 4, and the telematics information is downloaded (step S70) via the mobile communication network 4 upon determining that the telematics information is to be downloaded. These measures make it possible to distribute information for an area that may be relevant in affecting the congestion condition.

(2) The control unit 10 sets a target area (step S10) for which the decision-making in step S50 is executed. In step S50, it is decided that telematics information is to be downloaded if the weather information for the target area indicates rain or snow as the current weather or rain or snow as forecast weather for a predetermined number of hours ahead from the current time or the event information for the target area indicates a specific event currently being held or a specific event to be held a predetermined number of hours ahead from the current time. This enables optimal decision-making with regard to whether or not to download telematics information.

(3) The decision as to whether or not to download telematics information may be made in step S50 also based upon the congestion information included in the traffic information. By making the decision based upon the congestion information as well, more reliable decision-making as to whether or not to download telematics information can be executed.

(4) The control unit 10 may execute the decision-making in step S50 upon deciding to start the download decision-making (step S30) over predetermined time intervals or each time traffic information is obtained via the traffic information reception unit 15. Through these measures, telematics information can be downloaded with optimal timing.

(5) The control unit 10 makes a decision (step S20) as to whether or not the target area set in step S10 is located beyond a traffic information-available area. If the decision-making results indicate that traffic information for the target area is not available, it is then decided that telematics information is to be downloaded in step S70. Thus, if the target area is outside the traffic information-available area, telematics information will be automatically distributed to keep the user abreast of traffic conditions.

It is to be noted that while an explanation is given above in reference to the embodiment on an example in which telematics information stored and held in the distribution server 5 is distributed to the navigation apparatus 1 installed in the vehicle 100 via the mobile communication network 4 and the communication terminal 2, the present invention is not limited to this example. The telematics information can be distributed to any of various types of on-vehicle information terminals such as a personal computer, a PDA (personal digital assistant) and a portable telephone, other than the navigation apparatus. In addition, the present invention may be adopted in conjunction with an on-vehicle information terminal that includes a built-in communication terminal. Furthermore, information other than the congestion information may be distributed as telematics information. For instance, information on sightseeing locations or various types of facilities may be distributed as telematics information.

The embodiment described above and variations thereof are simply provided as examples and components other than those in the embodiments may be used as long as the features characterizing the present invention are not compromised.

What is claimed is:

1. An on-vehicle information terminal, comprising:
    a traffic information obtaining unit that obtains traffic information including first congestion information for roads and weather information, which indicates a current weather condition or a weather forecast through wireless communication;
    a decision-making unit that makes a decision, based upon the weather information, as to whether telematics information including second congestion information for roads additional to the first congestion information provided by a server via a mobile communication network is to be downloaded; and
    a download unit that downloads the telematics information via the mobile communication network if the decision-making unit has determined that the telematics information is to be downloaded.

2. An on-vehicle information terminal according to claim 1, further comprising:
    a target area setting unit that sets a target area for which the decision is made, wherein:
    the decision-making unit decides that the telematics information is to be downloaded if the weather information indicates rain or snow as current weather in the target area or rain or snow is forecast for the target area a predetermined number of hours ahead from the current time.

3. An on-vehicle information terminal according to claim 1, wherein:
    the decision-making unit makes the decision also based upon the first congestion information.

4. An on-vehicle information terminal according to claim 1, wherein:
    the decision-making unit makes the decision over predetermined time intervals or each time the traffic information is obtained by the traffic information obtaining unit.

5. An on-vehicle information terminal according to claim 1, further comprising:
    a target area setting unit that sets a target area for which the decision is made, wherein:
    the decision-making unit decides that the telematics information is to be downloaded if the traffic information for the target area is not available.

6. An information distribution system, comprising:
    an on-vehicle information terminal according to claim 1; and
    a server that provides the telematics information to the on-vehicle information terminal via the mobile communication network.

* * * * *